Feb. 20, 1934.  M. B. HOPKINS  1,948,267
PROCESS OF INCORPORATING OIL AND RESINOUS BODIES
Filed July 15, 1927
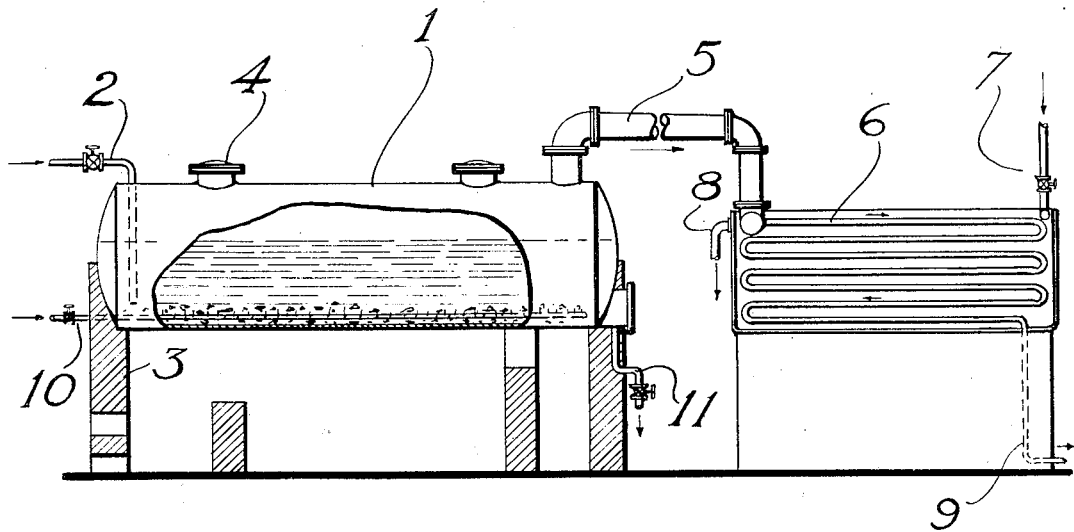
Inventor
MARION B. HOPKINS
By his Attorney
W. E. Currie Patented Feb. 20, 1934

1,948,267

UNITED STATES PATENT OFFICE 1,948,267

PROCESS OF INCORPORATING OIL AND RESINOUS BODIES

Marion B. Hopkins, Elizabeth, N. J., assignor to Standard Oil Development Company, a corporation of Delaware Application July 15, 1927. Serial No. 205,873

9 Claims. (Cl. 134—26)

This invention relates to the incorporation of resinous bodies with petroleum oils to produce electrically insulating materials either for use as such, or for impregnating other insulators, such as for instance, cable insulation. The term resinous bodies as herein used, comprehends the resins generally, including those formed by the condensation of aldehydes with organic amines and the substance called rosin, pine rosin being frequently employed.

The incorporation of rosin or resins in mineral oils and greases is difficult because high temperatures are necessary and the exposure of the oils to air at high temperatures injures their quality.

My method comprehends adding the resinous bodies to the petroleum oil and passing steam through the mixture under non-condensing conditions. I preferably employ dry steam for this purpose, viz. steam from which mechanically entrained globules of water have been removed by the use of a dephlegmator or a superheater, and I preferably carry out the operation in a covered vessel so that air is substantially excluded, the steam being suitably diverted after use.

The advantages of my process will become apparent to those skilled in the art when it is considered that the presence of hydrocarbon oxidation products and of even small amounts of moisture in insulating oils and greases reduces their electrical resistivity and makes them less stable during use.

In the preferred embodiment of my invention, the oil is mixed with a hydrocarbon of low boiling point, which will hereinafter be referred to as the added hydrocarbon, is placed in contact with the resinous bodies. The amount of resinous bodies may vary from a fraction of one percent up to 30 percent of the oil to be incorporated therewith. The boiling point of the hydrocarbon referred to is preferably so selected that boiling will commence at a temperature below that at which substantial oxidation of the oil and resinous bodies occurs. The mixture is then heated to the point at which the added hydrocarbon distills, thereby displacing oxygen from contact with the materials in the interval which precedes the introduction of steam. The vapors are conducted away, condensed and recovered in any suitable manner. The temperature of the materials is gradually raised to continue the removal of the added hydrocarbon, and when a temperature is reached at which water vapor will not condense, steam is introduced at a point below the level of the oil. The introduction of steam is continued until the substantially complete removal of the added hydrocarbon and the desired incorporation of the oil and resinous bodies has been obtained.

The accompanying drawing illustrates an apparatus for carrying out the process herein claimed.

The drawing and method of operation of the apparatus shown, will be concurrently described. The oil, in solution with the added hydrocarbon, is pumped to the still 1 through the valved pipe 2. The still rests on the firebrick setting 3, and is heated by any suitable means. The resinous bodies to be incorporated are introduced by means of removable cover 4, which is then closed. Heat is applied and distillation of the added hydrocarbon commences, the vapors passing off through line 5 into condenser 6. This condenser may be supplied with cooling water which is introduced by means of valved pipe 7, and escapes by means of the overflow 8. The condensed hydrocarbon passes off through pipe 9 to any suitable accumulator. As soon as the temperature of the materials in 1 is above that at which water vapor will condense, steam is introduced by means of the perforated valved pipe 10, and the introduction thereof is continued until the added hydrocarbon has been completely removed and the desired incorporation of the resinous bodies with the oil has been obtained. The final temperature of the oil and resinous bodies is ordinarily between 250 and 350° F. although other temperatures may be employed. As soon as the desired incorporation has been obtained, the mixture is drawn off through valved pipe 11 and placed in suitable containers.

The mixed oil or grease and resinous bodies can be treated without the presence of added solvent by heating the mixture rapidly to a temperature at which dry steam will not condense. Subsequently the resinous bodies can be dissolved in the oil or grease by agitating the mixture with dry steam whereby air is excluded from contact with the mixture.

It will be understood that the apparatus shown is in illustration only and that any form of apparatus suitable for carrying out the process described may be employed without departing from my invention.

I claim:

1. The process of incorporating resins in petroleum oil, which comprises heating the oil and resins to a temperature above that at which steam condenses, under substantially non-oxidizing conditions, passing steam through the mixture and maintaining steam over the surface of the mixture under non-condensing conditions until the resins are completely dissolved in the oil.

2. Process according to claim 1, carried out in a covered vessel, in which a low boiling hydrocarbon is added before heating the mixture, then gradually heating to vaporize said hydrocarbon, thereby displacing oxygen from contact with the oil-resin mixture before introducing the steam.

3. Process according to claim 1, in which dry steam is used.

4. Process according to claim 1, in which the oil and resins are maintained at a temperature between 250 and 350° F. during the introduction of steam.

5. Process according to claim 1, in which pine rosin is used in an amount less than 30% of the oil to be incorporated therewith.

6. Process according to claim 1, in which electrically insulating material is produced.

7. Process according to claim 1, in which the initial heating is carried out without excluding air but is carried out so rapidly as to prevent any substantial oxidation before the introduction of steam.

8. The process of preparing electrically insulating oils and greases, which comprises heating a mixture of petroleum oil and resins to a temperature above that at which steam condenses, under substantially non-oxidizing conditions, passing steam through the mixture and maintaining steam over the surface of the mixture under non-condensing conditions until the resins are completely dissolved in the oil.

9. An electrically insulating composition of matter, comprising petroleum oils and greases prepared by heating a mixture of petroleum oil and resins to a temperature above that at which steam condenses, under substantially non-oxidizing conditions, passing steam through the mixture and maintaining steam over the surface of the mixture under non-condensing conditions until the resins are completely dissolved in the oil.

MARION B. HOPKINS.